United States Patent [19]
Schott, Jr.

[11] 3,791,567
[45] Feb. 12, 1974

[54] WEB GRIPPING, ADVANCING APPARATUS

[75] Inventor: Charles M. Schott, Jr., Gloucester, Mass.

[73] Assignee: Gloucester Engineering Co., Inc., Gloucester, Mass.

[22] Filed: Dec. 17, 1971

[21] Appl. No.: 209,280

[52] U.S. Cl. .................. 226/112, 226/149, 226/151, 425/214, 425/388, 425/373, 425/DIG. 48
[51] Int. Cl. ............................................ B65h 17/36
[58] Field of Search ... 226/112, 165, 166, 149, 151; 425/71, 126, 224, 387, 388, 373, DIG. 48

[56] References Cited
UNITED STATES PATENTS

| | | | |
|---|---|---|---|
| 3,709,650 | 1/1973 | Gutoski et al. | 425/373 |
| 3,341,888 | 9/1967 | Bridge et al. | 425/71 X |
| 3,561,057 | 2/1971 | Butzko | 425/214 |
| 1,275,984 | 8/1918 | Bailey | 226/149 |
| 1,376,668 | 5/1921 | Blomberg et al. | 226/165 X |
| 2,388,423 | 11/1945 | Langdon | 226/151 |
| 2,792,869 | 5/1957 | Halvorsen | 226/149 X |
| 3,126,138 | 3/1964 | Onulak | 226/151 |
| 3,359,600 | 12/1967 | O'Brien et al. | 425/DIG. 48 |
| 3,556,376 | 1/1971 | Offterdinger | 226/151 |

*Primary Examiner*—Robert L. Spicer, Jr.

[57] ABSTRACT

Web gripping, advancing and forming apparatus operable periodically upon successive portions of a continuous web such as heat-softened plastic sheet for forming articles therefrom. The advancing mechanism includes a pair of elongated indexing jaws disposed in an axial direction parallel to the length of the web, arranged together to grip the web over a long extent in the direction of the length of the web, a driver for advancing and retracting the indexing jaws in the axial direction and a clamping assembly, fixed in the axial direction, the clamping assembly mounted to clamp the jaws together while permitting their axial movement for advancing the web, and to release the jaws while permitting their axial retracting movement. A clamping mechanism includes a spaced apart series of pressing members arranged to press a jaw against a web, the series of pressing members connected to a series of cranks operated in unison by a control rod, preferably with springs either biasing the cranks to gripping position or springs interposed between the control rod and cranks so that the rod acts through springs in urging the jaw to gripping position. Pressing members in the form of rollers permit relative axial movement of jaws, forming a path therefor. The axially moving indexing jaws, of low inertia and lacking self-support against buckling, are slidably guided and supported by axially fixed surfaces including holding jaws. The mechanism extends the length of both warming ovens and forming dies.

18 Claims, 8 Drawing Figures

WEB GRIPPING, ADVANCING APPARATUS

This invention relates to forming machines operable periodically upon successive portions of a continuous web for forming articles therefrom and more particularly to the advancing mechanism for moving the web through such machines.

The objects of this invention include supporting and maintaining dimensional control of a web fed periodically into a forming machine, even though the web be flaccid, rapidly advancing a web in steps through a forming machine, minimizing the quantity of web wasted in a periodic forming operation, and providing an advancing mechanism and forming machine to accomplish the above which is simple and reliable, and enables long indexing steps.

One aspect of the invention features a web advancing mechanism including a pair of elongated indexing jaws disposed in an axial direction parallel to the length of the web, the jaws arranged together to grip the web over an elongated region extending in the direction of the length of the web, a driver, preferably a hydraulic cylinder, for advancing and retracting the indexing jaws in the axial direction and a clamping assembly, fixed in the axial direction, this clamping assembly being mounted to clamp the jaws together while permitting their axial movement for advancing the web and to release the jaws while permitting their axial retracting movement.

In preferred embodiments two pairs of indexing jaws are disposed to act along opposite edges to cooperate in positioning the web; pairs of elongated holding jaws are provided along each edge, activated by a respective clamping assembly to press the holding jaws together to hold the web stationary during retraction and to release the web during advancement of the indexing jaws; and a web softening station such as an oven positioned to precede the forming mechanism, with the holding jaws extending at least over the combined axial extent of the forming mechanism and the softening station and in which the indexing jaws in their retracted position extend upstream at least to the entrance to the softening station and in their advanced position extend at least to the downstream end of the forming mechanism, the jaws cooperating to maintain continuous dimensional control over all portions of the web which have been softened but not formed. Preferred embodiments also feature the clamping assembly formed by a plurality of devices disposed at positions spaced apart longitudinally along the length of the indexing jaws, and this assembly in which the plurality of devices comprise two sets of rollers, preferably spring loaded, one set associated with each index jaw, the roller arranged to define a guide path for the indexing jaws, with this path extending in the direction of travel of the jaws, and with the sets of rollers adapted to apply oppositely acting clamping forces to the jaws.

In further preferred embodiments employing such rollers, a mechanism is provided for moving the rollers in coordination to apply the clamping forces during advancement of the indexing jaws and to release the forces during retraction of the indexing jaws. Preferably each roller is mounted for rotation about an axis on a crank, and this crank is rotatable on an axis parallel to and displaced from the roller axis whereby rotation of the crank moves the roller to forceably bear on an indexing jaw. The roller surfaces are aligned to define a straight line path for the respective indexing jaws, the straight lines being parallel to each other and to the direction of travel of the jaws, the jaws having roller-engaging surfaces that are straight and parallel to the direction of travel. Thus, as the jaws advance, the points of application of force progressively shift relative to the jaws themselves without change of position of the jaws relative to each other. A series of cranks associated with one set of the rollers, one crank with each roller, and all the cranks connected to move in unison, serve to change the spacing of the rollers relative to the second set of rollers and thus apply and relieve the clamping forces. In this arrangement preferably a push rod connects the cranks, while a spring is interposed between each crank and the rod, so that the respective roller acts resiliently against the respective jaw.

Preferred embodiments of the invention feature indexing jaws of such light weight and low inertia that they lack self-support against detrimental flexing in a lateral direction with the provision of lateral guides to prevent their flexing while guiding their movement; and these indexing jaws are preferably in the form of elongated bars of substantially rectangular cross-section, each of the bars having a thickness less than one-fifth of its width, the widthwise direction of the bars being arranged in the direction of clamping forces and the lateral guides are arranged to support the bars in the direction of thickness to prevent buckling.

Another aspect of the invention features an advancing mechanism as described for delivering the plastic web to the die station in a dimensionally stable condition.

Preferred embodiments of this aspect of the invention include a web-softening station preceding the die, with the elongated indexing jaws having an extent longer than the die and in the retracted position adapted to engage softened web at the softening station and thereafter advance the web to the die; a web softening station in the form of an oven in which the indexing jaws extend into the oven, and including a heat shield positioned to shield the indexing jaws and the clamping assembly from heat applied to the web; and such an oven in which the distance between the jaws gripping one edge of the web are adjustable in distance from the jaws gripping the other edge of the web to accommodate a plurality of web widths.

Another aspect of the invention features a web gripping mechanism comprising a spaced apart series of pressing members, the pressing members arranged to press a jaw against a web to be gripped, each of the pressing members connected to a member of a series of pivotal cranks, a control rod engaged with each of the series of pivotal cranks, and actuating means operable to translate the rode, thereby to produce pivotal movement of the cranks and movement of the series of pressing members in unison. In certain preferred embodiments a series of springs biases the pressing members into normal resilient gripping relation, and the rod is adapted to overcome the pressure of these springs. The pressing members are preferably mounted on slidable blocks, the blocks adapted to slide relative to their respective cranks during actuation and in one such embodiment the pressing members comprise shafts rigidly secured to a gripping jaw. In certain other preferred embodiments there are provided a series of compression springs, one associated with each of the cranks, the control rod is connected to apply gripping pressure to the cranks through the springs and the pressing members comprise rollers mounted eccentrically with respect to the pivot point of the cranks.

Another aspect of the invention features a plastic web advancing mechanism with a set of indexing jaws and a set of holding jaws mounted side by side, both sets being elongated and having slide surfaces, with the indexing jaws disposed against and slidably guided by the holding jaws during axial movement. In preferred embodiments of this aspect, the indexing jaw comprises a strip-form member having oppositely directed planar side surfaces, one side surface engaged with and guided by the respective holding jaw, the opposite side surface engaged by and guided by a complementary guide means. When the indexing jaw is reciprocable in the transverse direction perpendicular to the web for gripping and releasing the web, the respective holding jar guides the indexing jaw in both its axial and its transverse directions. In certain embodiments the indexing jaw is flexible, and non-self-supporting in the direction perpendicular to its slide surface, and the slide surface of the respective holding jaw supports the indexing jaw against columnar buckling, enabling the indexing jaw to be driven axially in a straight line.

A particular advantage of certain aspects of the invention is that the assembly clamping the indexing jaws together does not participate in the axial reciprocating motion of the indexing jaws so that the inertia of the system is minimized to facilitate rapid and accurate motion of the jaws. Another advantage is that the jaws may extend over the entire length of the softened portion of the web along the edges so that the web is supported continuously and uniformly. A further advantage is that the web clamping assembly, when acting through springs, facilitates the self-adjustment of the cooperating parts of the mechanism and accommodation to web irregularities.

Other objects, features and advantages will be apparent from the following description of a preferred embodiment together with the drawing wherein.

DESCRIPTION OF PREFERRED EMBODIMENT

Figure 1:
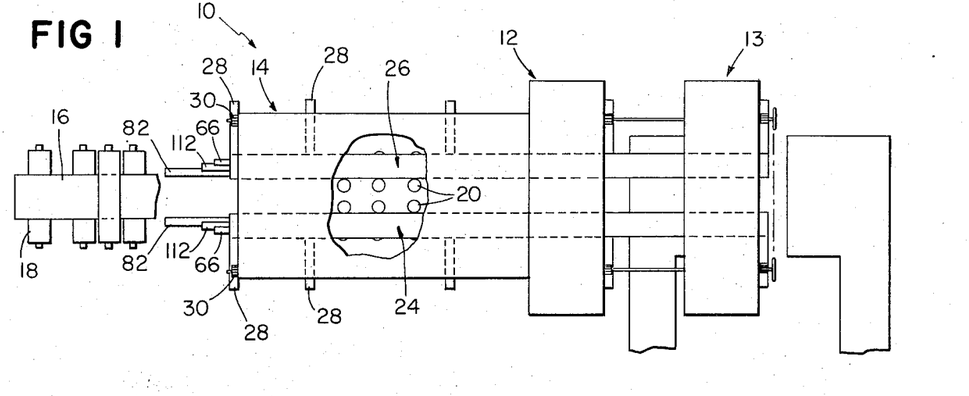
FIG. 1 shows a general plan view of a machine employing an advancing mechanism according to the invention and including a forming station preceded by a softening oven.
Figure 2:
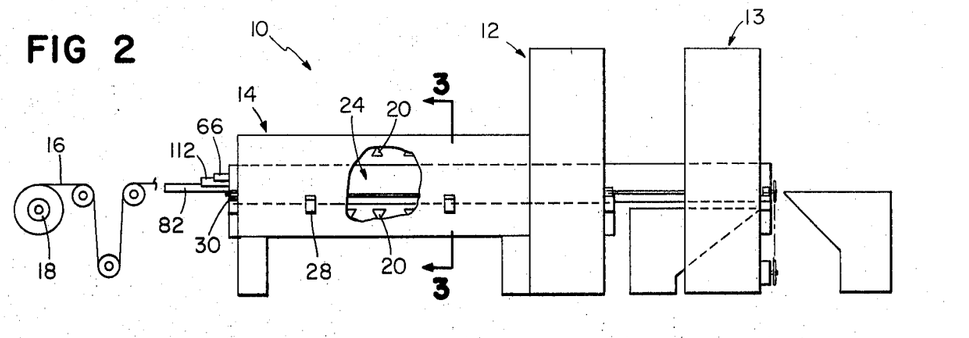
FIG. 2 shows an elevation view of the same machine.
Figure 3:
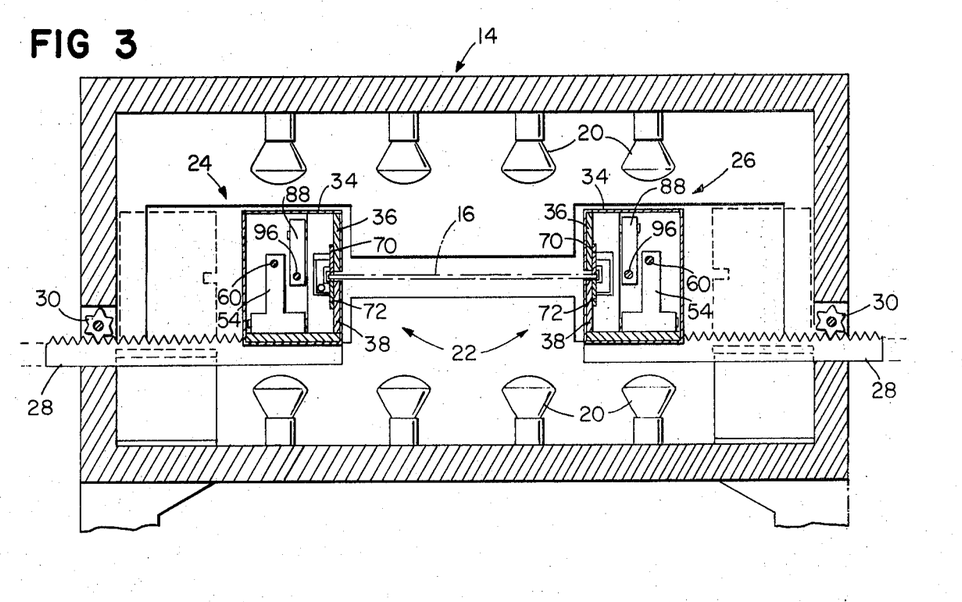
FIG. 3 shows a cross section of the softening oven of FIGS. 1 and 2 taken along section 3—3.
Figure 4:
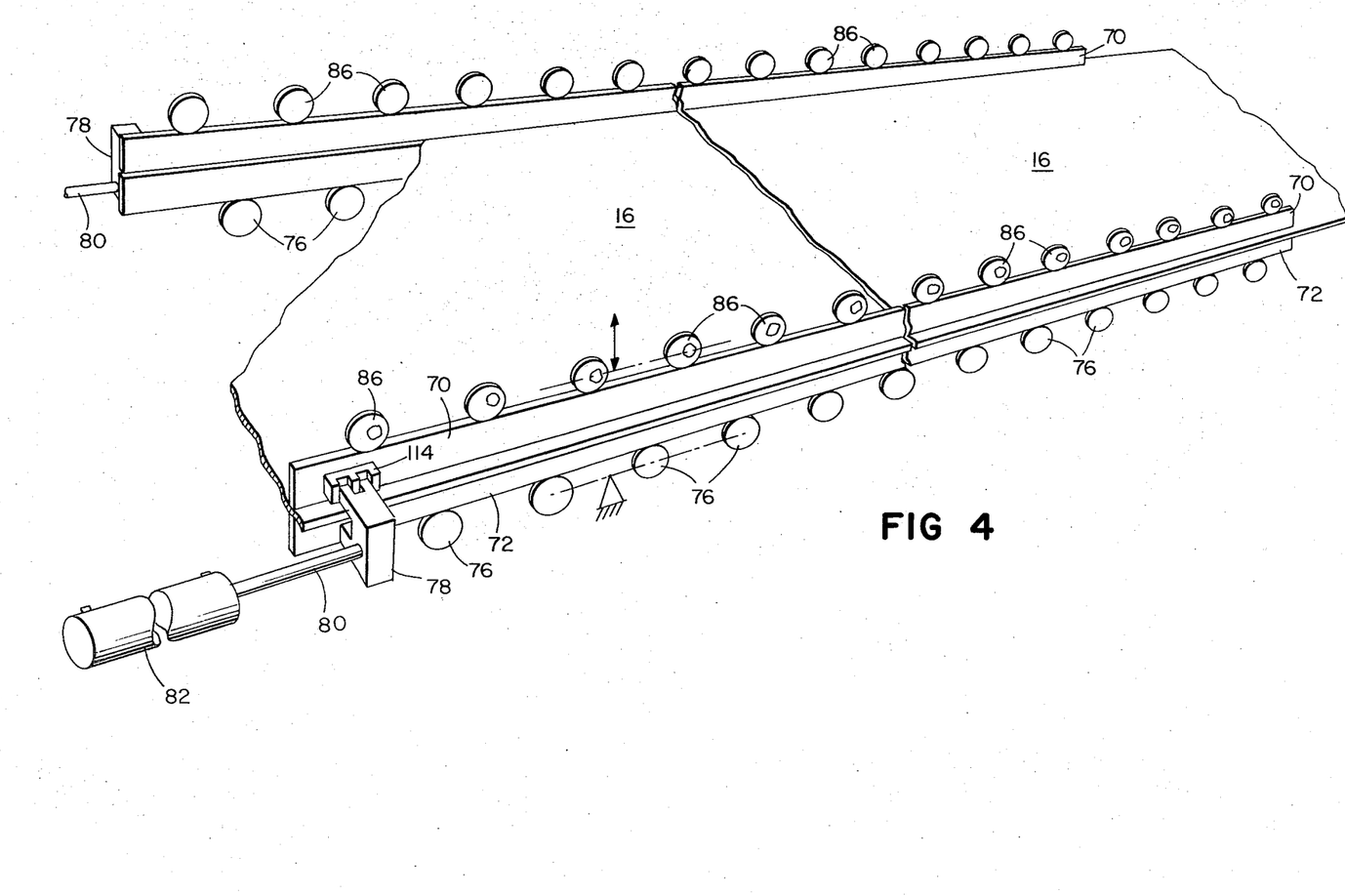
FIG. 4 shows the indexing jaws of the machine of FIG. 1 with a portion of the web and parts of the drive mechanism moving the jaws.
Figure 5:
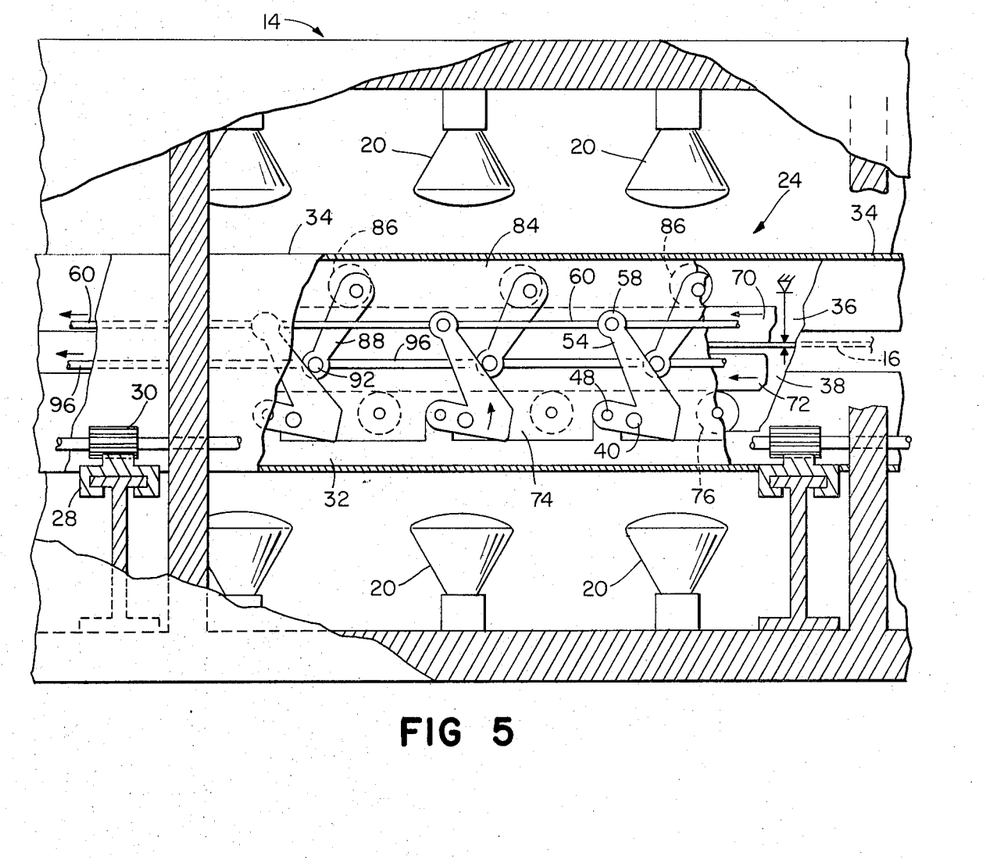
FIG. 5 shows a side view of a portion of the machine with the outer cover broken away and some parts removed for clarity.
Figure 8:
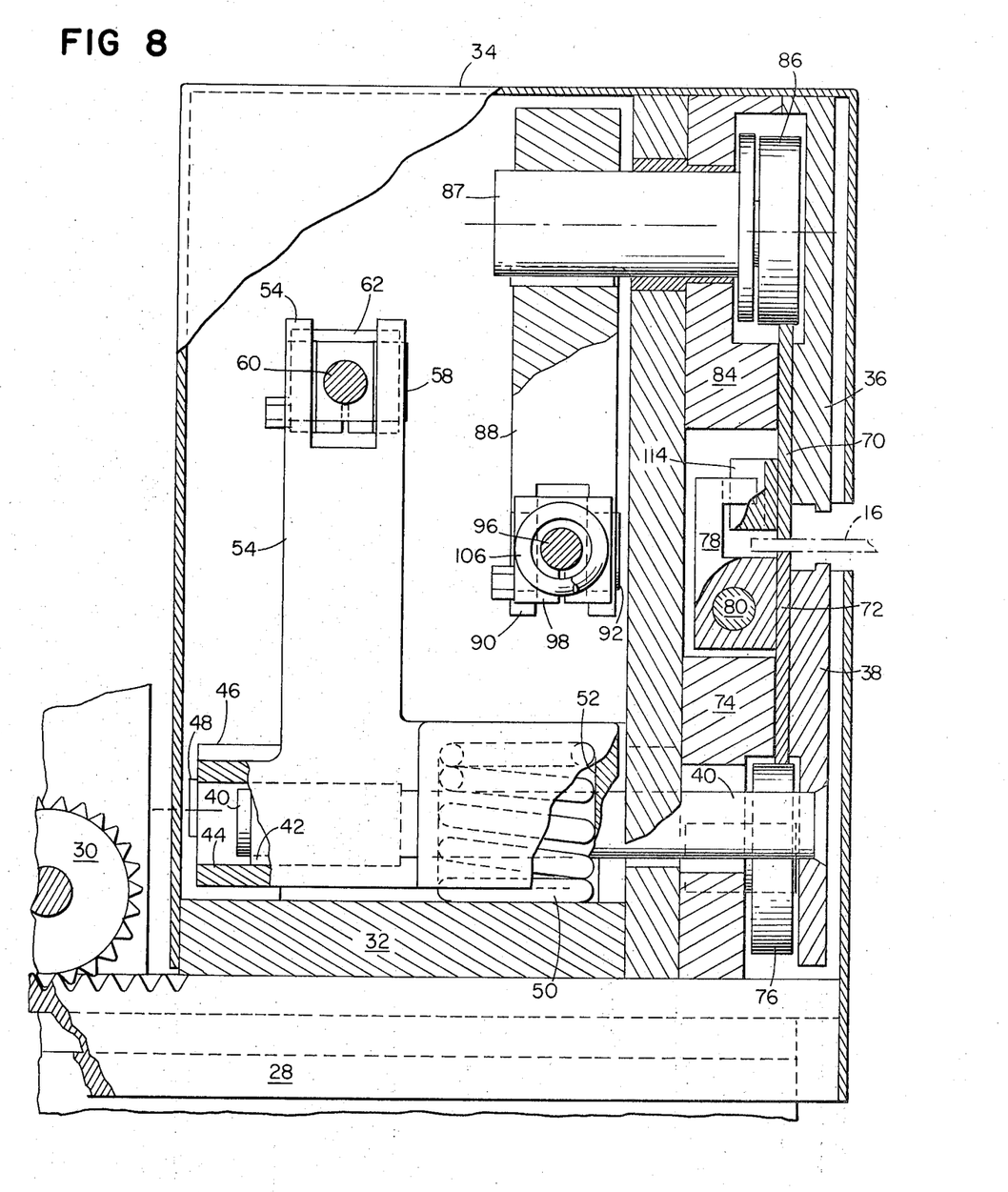
FIG. 8 shows a detail in cross section of the jaws and clamping assembly shown in FIG. 6.

As shown in the drawing (FIGS. 1 and 2), web forming machine 10 includes forming mechanism 12 (a die station in the preferred embodiment) and softening oven 14. Web 16 is led from supply roll 18 into softening oven 14 and thence into forming mechanism 12 and trimmer 13. Heaters 20 within oven 14 warm and soften the web. A web advancing mechanism 22 (FIG. 3) advances the web in steps through oven 14 and forming mechanism 12. The web advancing mechanism has two identical clamping assemblies 24 and 26 (FIG. 6) situated along opposite edges of the web which can be moved by racks 28 (see especially FIGS. 3, 8) and pinions 30 closer to or farther from each other to accommodate webs of various widths. As shown particularly in FIG. 5, assembly 24 has a structural base 32 to which is affixed shield 34 to protect the assembly from the heat of heaters 20.

Assembly 24 includes a pair of holding jaws 36 and 38 opposed across the thickness of web 16. These jaws do not move axially. Jaw 36 is affixed to base 32, and jaw 38 is movable in the transverse direction (i.e., in the direction perpendicular to the plane of the web). For this purpose shafts 40 are affixed to jaw 38 and are journaled in blocks 42. Blocks 42 are slidably mounted in slots 44 of cranks 46, which are rotatable on pivots 48 affixed to base 32. Compression springs 50 are held within recesses 52 of cranks 46 and bear against base 32 and cranks 46. Ends 54 of cranks 46 are formed into forks 56 holding bearing pins 58 which have holes accommodating push rod 60. Collars 62 with flat portions 64 fitting within forks 56 are affixed to push rod 60. With this arrangement, the springs bias cranks 46 counterclockwise (FIG. 6) tending to raise jaw 38 to grip the web with resilient pressure. Rightward movement of actuating rod 60 rotates cranks 46 clockwise, the carrying shafts 60 (and attached jaw 38) downward, with leftward sliding of the blocks in the crank, thus releasing the web. The linkage between holding jaw 38 and push rod 60 including shaft 40, block 42, and crank 46 is repeated at intervals along the length of the jaw. The number of such linkages will be readily selected by one skilled in the art to accommodate the length of a particular machine. In a typical instance there might be 40 such linkages along the length of a 20 foot jaw. Push rod 60 is connected through link 63 to hydraulic cylinder 66 which is operated by conventional hydraulic control systems well known in the art.

Assembly 24 also includes a pair of indexing jaws 70 and 72 opposed to each other across the thickness of web 16. Jaw 72 is constrained laterally (that is to say, in the direction of the width of the web) between holding jaw 38 and guide 74 and rides on a set of lower rollers 76 rotatably mounted on axes fixed to base 32. These rollers define a straight line guide path parallel to the direction of travel of jaws 70, 72 in the longitudinal direction. Jaws 70, 72 extend longitudinally approximately the entire length of the web forming machine including both oven and forming station which might in a typical instance be 20 feet. The transverse dimension of jaws 70, 72 (that is to say, perpendicular to the web) is typically 2 inches and the lateral dimension is less than one-fifth the transverse dimension (typically one-eighth of an inch). Indexing jaw 72 is rigidly connected through drive block 78 to push rod 80 which is connected to hydraulic cylinder 82 operated by conventional hydraulic equipment. Indexing jaw 70 is situated between holding jaw 36 and guide bar 84, the latter being rigidly affixed to base 32. Jaw 70 is constrained against lateral movement by holding jaw 36 and guide 84 but is free to slide both transversely and longitudinally. Jaw 70 rides against a set of upper rollers 86 which are rotatable on center axes, and their center axes are mounted eccentrically on journals 87 to which are connected cranks 88. The axes of journals 87 are fixed to base 32, and thus when cranks 88 are turned they raise or lower the eccentrically mounted axes of rollers 86, to effect gripping and release of the web. The rotation force for gripping is applied through a spring to make the grip resilient. To this end cranks 88 have forked ends 90 holding bearing pins 92 having a hole through which slides push rod 96. Pinch collars 98 with flat portions 102 which slip within forked ends 90 of cranks 88 are affixed to rod 96, so as to be adjacent to forked ends 90 of cranks 88. Slip collars 104 are slidably fitted to rod 96 on the opposite sides of forked ends 90. Springs 106 extend between fixed collars 98 and slip collars 104. Springs 106 are normally in a state of compression and so press the collars towards the adjacent cranks. The linkage consisting of roller 86, crank 88, collars 98 and 104, and spring 106 is repeated a number of times along the length of jaw 70. The number of such linkages will be readily chosen by one skilled in the art to accommodate the required length of the forming machine, and in a typical machine there might be 40 such linkages. Push rod 96 is connected through link bar 110 to hydraulic cylinder 112 operated conventionally. Jaw 70 is affixed to slide block 114 which engages drive block 78, the engagement permitting transverse motion of jaw 70 independent of jaw 72 while constraining coordinated longitudinal movement of jaw 70 and 72.

Figure 6:
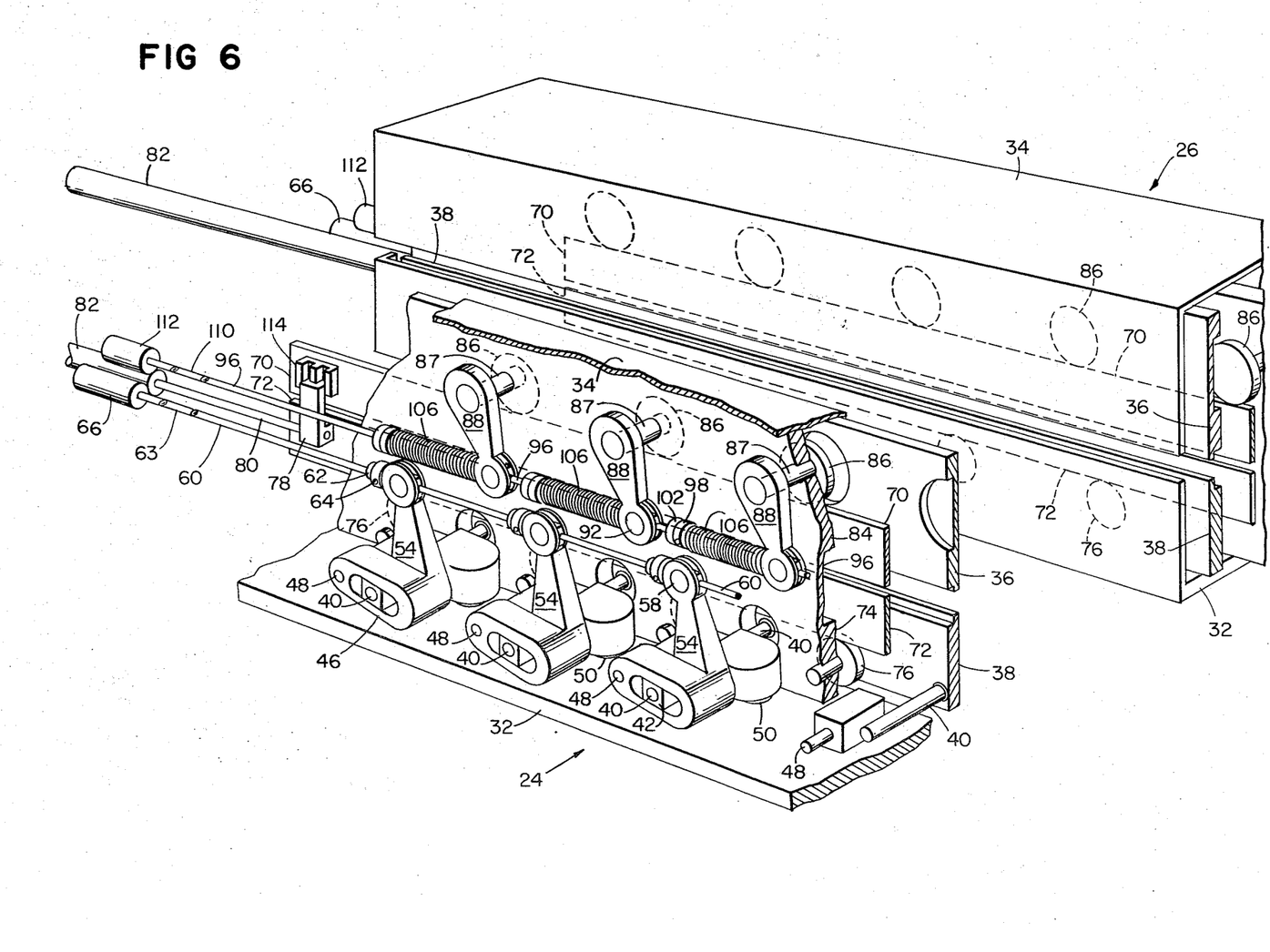
FIG. 6 shows a perspective, partly cut away view of the jaws and associated operating mechanism of the machine of FIG. 1.
Figure 7:
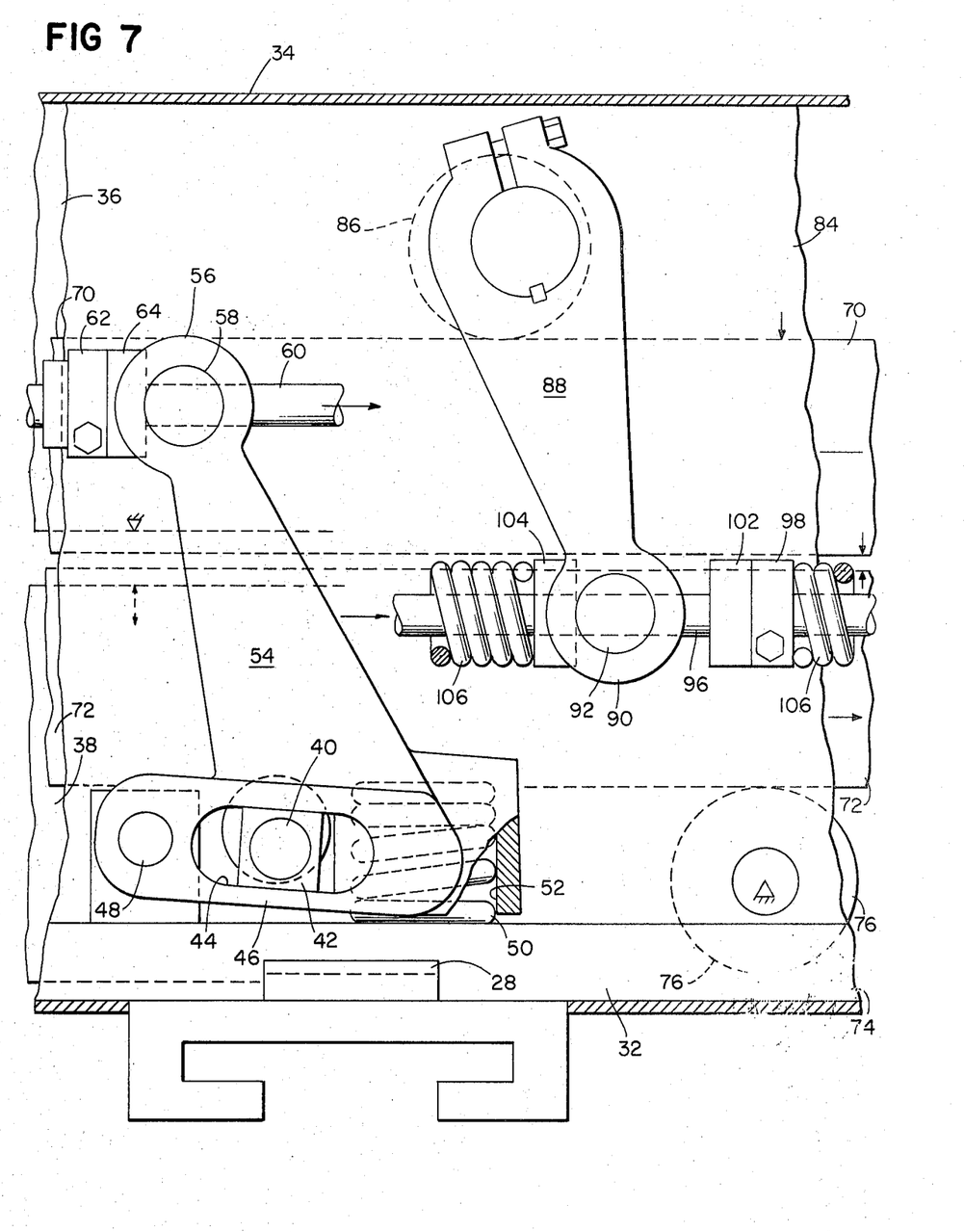
FIG. 7 shows a detail in elevation of the clamping assembly for the jaws shown in FIG. 6.

In general terms the operation of the preferred embodiment follows a cycle having a holding period in which holding jaws 36, 38, under the influence of springs 50, firmly hold a portion of the web extending through the softening oven and the forming station. During this holding period the forming operation takes place and indexing jaws 70, 72, released from vertical pressure, retract in the direction of the web feed supply. The indexing jaws then grip the web, thereupon the holding jaws' grip is relaxed. The indexing jaws thereupon advance the whole softened portion of the web a unit length through the machine so that a new softened portion of the web is presented at the forming station. The holding jaws then grip the web firmly and the cycle is repeated. More particularly, during the holding portion springs 50 press cranks 46 in unison upwards, and these cranks acting in turn through slide block 42 and rod 40 move holding jaw 38 upwards to grip and hold web 16 between jaw 38 and holding jaw 36. The rotating motion of crank 46 is accommodated to the sliding motion of jaw 38 by block 42 sliding in slot 44 while pivoting on bar 40. Hydraulic cylinder 112 for clamping the index jaws then acts through link 110 and push rod 96, pulling all collars 98 to the left (as seen in FIG. 6) to push all ends of cranks 88 leftward. The resulting unison pivoting of cranks 88 raises the axes of rollers 86 journaled thereupon (see dotted line, FIG. 7) and releases the downward force exerted by rollers 86 on jaw 70 so that jaws 70 and 72 no longer firmly grip the web. At this point hydraulic cylinder 82 acting through push rod 80 and slide block 78 retract jaws 70 and 72 to the left. In this motion, jaws 70 and 72 roll along rollers 86 and 78 and slide lightly against web 16. A rapid retraction of the jaws 70 and 72 is facilitated by the thinness and consequent low inertia of jaws which alone participate in the retraction motion while bending or other undesirable lateral motion of the jaws is prevented by laterally constraining guides 84 and 74, which, being stationary, contribute nothing to the inertia of the moving system. The thinness of jaws 70 and 72 also reduces the portion of the web which is inaccessible for forming. After indexing jaws 70 and 72 are fully retracted, hydraulic cylinder 112 acting through link 110 and push rod 96 drives all collars 98 to the right. Collars 98 push before them springs 106 which in turn push sliding collars 104 against ends 90 of cranks 88. Cranks 88 are thereby moved to the right and held to the right by the spring action of now compressed springs 106. This motion of cranks 88 lowers the axes of rollers 86 so that rollers 86 are resiliently urged against indexing jaw 70 forcing it to grip the web against indexing jaw 72. At this point the whole extent of the softened web is firmly secured by the indexing jaws 70 and 72 and hydraulic cylinder 66 acting through link bar 63 and push rod 60 drives all collars 62 to the right. Cranks 46 are thereby rotated around pivots 48 compressing springs 50 and, acting through slide bars 42 and shafts 40, drive holding jaw 38 downwards, thereby disengaging the grip of jaws 38 and 36 on web 16. Next, hydraulic cylinder 82 operating through push rod 80 and slide block 78 advances jaws 70 and 72 to the right. During this advancing motion, jaw 72 rolls over rollers 76 and is guided by guide 74 and the side of jaw 38 while jaw 70 moves in rolling contact with rollers 86 and is guided by guide 84 and jaw 36. The uniform grip on the web by jaws 70 and 72 is maintained during advance by the force from springs 106 acting through collars 104, cranks 88, and rollers 86 to press jaw 70 downwards toward jaw 74. after the web has been advanced a unit operating length, hydraulic cylinder 64 operates as before described to move holding jaw 38 upwards and grip the web, and the cycle is repeated. The mechanism and operation of assembly 26 which advances the opposite edge of the web is identical with that of assembly 24 described above. The timing and coordination of the action of hydraulic cylinders 64, 82, 112 and the counterparts thereof in assembly 26 are effected by conventional hydraulic control equipment well known and needing no further description for those skilled in the hydraulic control art.

It should be particularly noted that in the above described operation the whole of the edges of the softened portion of the web are at all times securely held in at least one set of jaws which thereby support the web and resist undesirable dimensional changes in the softened web. It should further be noted that the grips of each set of jaws is maintained through spring action with the result that the adjustment of the various linkages is easier and also that a more uniform gripping pressure is applied in spite of nonuniformities in the web thickness.

I claim:

1. In a machine operable periodically upon successive portions of a continuous web, the machine including an advancing mechanism, the improvement wherein said advancing mechanism includes a pair of elongated indexing jaws disposed in an axial direction in the direction of the length of the web, arranged together to grip said web over an elongated region extending in the direction of the length of the web, a driver for advancing and retracting said indexing jaws in the axial direction and a clamping assembly, fixed in the axial direction, said clamping assembly mounted to clamp said jaws together while permitting their axial movement for advancing the web, and to release said jaws while permitting their axial retracting movement.

2. The machine of claim 1 wherein said pair of indexing jaws are disposed to act along a first edge of said web and a second pair of indexing jaws are disposed along an opposite edge to cooperate with said first pair of indexing jaws in positioning said web.

3. The machine of claim 2 including, along each edge, a first holding jaw, an opposed second holding jaw, and a clamping assembly, said holding jaws being elongated and disposed in the direction of the axis of said web, and the respective clamping assembly mounted to press said holding jaws together to hold said web stationary during retraction of said indexing jaws and to release said web during advancement of said indexing jaws.

4. The machine of claim 1 wherein said clamping assembly includes a plurality of devices disposed at positions spaced apart longitudinally along the length of said indexing jaws.

5. The machine of claim 4 wherein said devices comprise two sets of rollers, one set associated with each such index jaw, the rollers arranged to define a guide path for said indexing jaws, said path extending in the direction of travel of said jaws, the said sets adapted to apply oppositely acting clamping forces to said jaws.

6. The machine of claim 5 wherein said rollers are spring loaded.

7. The machine of claim 6 including a mechanism for moving said rollers in coordination to apply said clamping forces during advancement of said indexing jaws and to release said forces during retraction of said indexing jaws.

8. The machine of claim 7 wherein said indexing jaws lack self-support against detrimental flexing in a lateral direction and including lateral guides adapted to prevent said flexing while guiding movement of said indexing jaws.

9. The machine of claim 8 wherein said indexing jaws comprise elongated bars of substantially rectangular cross-section, each of said bars having a thickness less than one-fifth of its width, the widthwise direction of said bars arranged in the direction of clamping forces and said lateral guides arranged to support said bars in the direction of thickness.

10. The machine of claim 7 wherein said roller moving mechanism includes a hydraulically driven push rod and cylinder.

11. The machine of claim 7 wherein each said roller is mounted for rotation about an axis on a crank and wherein said crank is rotatably mounted on an axis parallel to and displaced from said roller axis whereby rotation of said crank moves said roller to forceably bear on one said indexing jaw.

12. The machine of claim 7 wherein the rollers of each set are all of the same diameter and arranged to define a straight line path for the respective indexing jaws, said straight lines being parallel to each other and to the direction of travel of the jaws, the jaws having roller-engaging surfaces that are straight and parallel to said direction of travel, whereby, as said jaws advance, the points of application of force progressively shift relative to the jaws themselves without change of position of the jaws relative to each other.

13. The machine of claim 12 including a series of cranks associated with one set of said rollers, one crank with each roller, said cranks connected to move in unison to change the spacing of said rollers relative to said second set of rollers thereby to apply and relieve said clamping forces.

14. The machine of claim 13 including a push rod connecting said cranks, a spring interposed between each crank and said rod effective to resiliently urge the respective roller against the respective jaw.

15. A web advancing mechanism comprising two sets of opposed, elongated jaws mounted side by side, a first set comprising indexing jaws mounted for axial movement, the second set comprising holding jaws, said indexing jaws and said holding jaws having slide surfaces, each indexing jaw being disposed against and slidably guided by a respective holding jaw during axial movement.

16. The advancing mechanism of claim 15 wherein a said indexing jaw is reciprocable in the transverse direction, perpendicular to the web for gripping and releasing said web, said respective holding jaw constructed and arranged to guide said indexing jaw in both axial and transverse directions.

17. The advancing mechanism of claim 15 wherein said indexing jaw comprises a strip-form member having oppositely directed planar side surfaces, one of said side surfaces engaged with and guided by the respective holding jaw, the opposite side surface engaged by and guided by a complementary guide means.

18. The advancing mechanism of claim 15 wherein a said indexing jaw is flexible, and non-self-supporting in the direction perpendicular to its slide surface, the slide surface of the respective holding jaw supporting said indexing jaw against columnar buckling, enabling said indexing jaw to be driven axially in a straight line.

* * * * *